United States Patent [19]

Bosco

[11] 4,136,838
[45] Jan. 30, 1979

[54] MACHINE FOR WINDING MAGNETIC TAPES ONTO CASSETTES

[75] Inventor: Angelo Bosco, Milan, Italy

[73] Assignee: AEG-Telefunken-Societa Italiana per Azioni, Milan, Italy

[21] Appl. No.: 770,051

[22] Filed: Feb. 18, 1977

[30] Foreign Application Priority Data

Mar. 1, 1976 [IT] Italy ............................... 20733 A/76

[51] Int. Cl.² ........................................... B65H 19/20
[52] U.S. Cl. ................................... 242/56 R; 242/58.4
[58] Field of Search ............... 242/56 R, 67.3 R, 58.1, 242/58.4, 58.5, 181, 182, 183, 186; 156/502, 506

[56] References Cited

U.S. PATENT DOCUMENTS

| 3,637,153 | 1/1972 | King | 242/67.3 R X |
| 3,814,343 | 6/1974 | Bennett | 242/56 R |
| 3,940,080 | 2/1976 | Bennett | 242/56 R |
| 3,997,123 | 12/1976 | King | 242/56 R |

Primary Examiner—Edward J. McCarthy

Attorney, Agent, or Firm—Cushman, Darby & Cushman

[57] ABSTRACT

A machine for winding magnetic tapes onto cassettes with a preparation assembly and a filling assembly disposed one in front of the other. The filling assembly has support and unwinding means for a reel of magnetic tape, a support and filling seat for the cassette and a cutting and jointing area comprising cutting means and jointing means. The preparation assembly comprises in turn a temporary support seat for the empty cassette and extractor means operable in such a manner as to extract a middle portion of connecting tape from the empty casette and dispose it in front of the cutting and jointing area of the filling assembly. First transfer means are operable to transfer the cassette from the temporary support seat of the preparation assembly to the support and filling seat of the filling assembly, and second transfer means operable to simultaneously transfer the already extracted connecting tape from the preparation assembly to the cutting and jointing area of the filling assembly.

5 Claims, 18 Drawing Figures

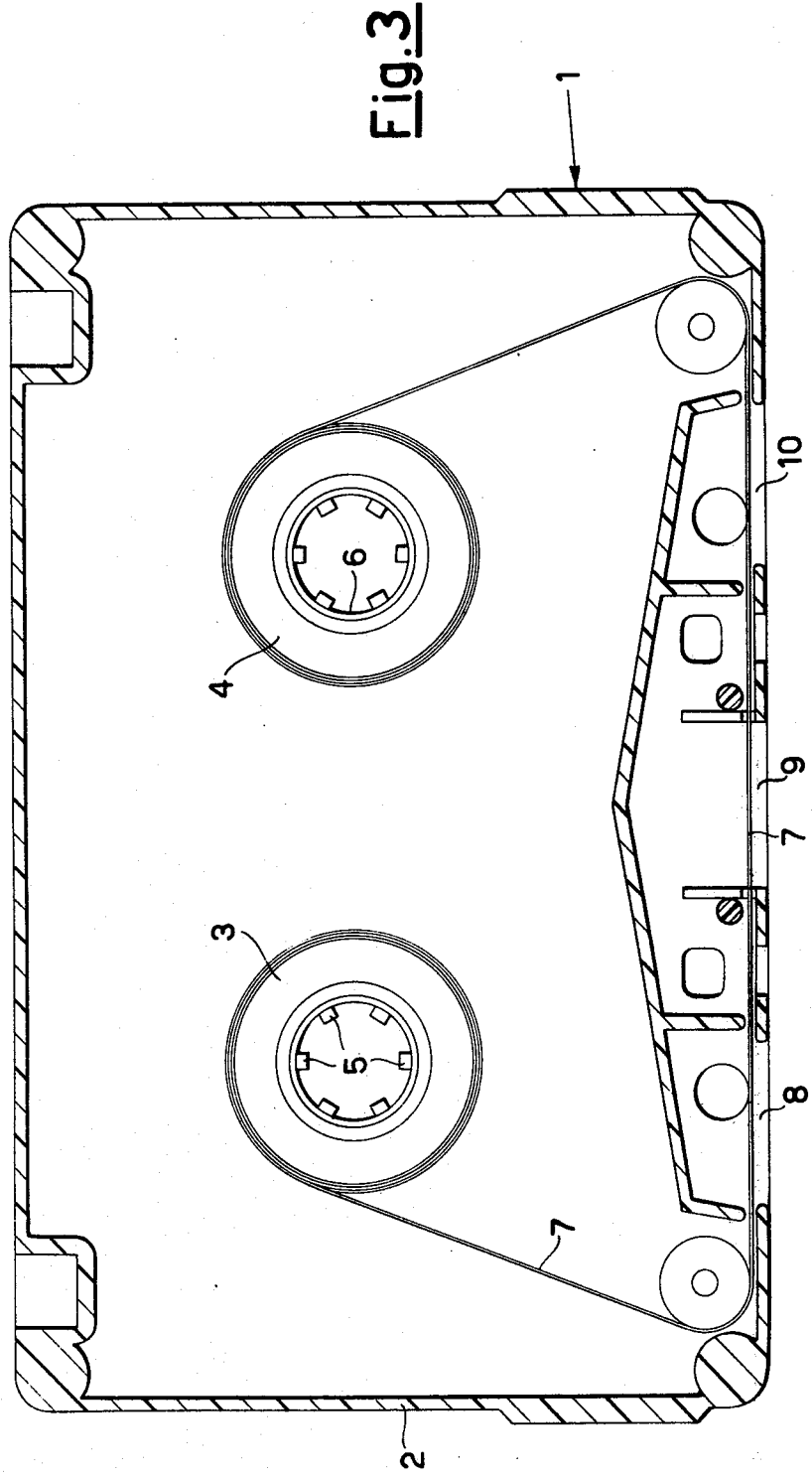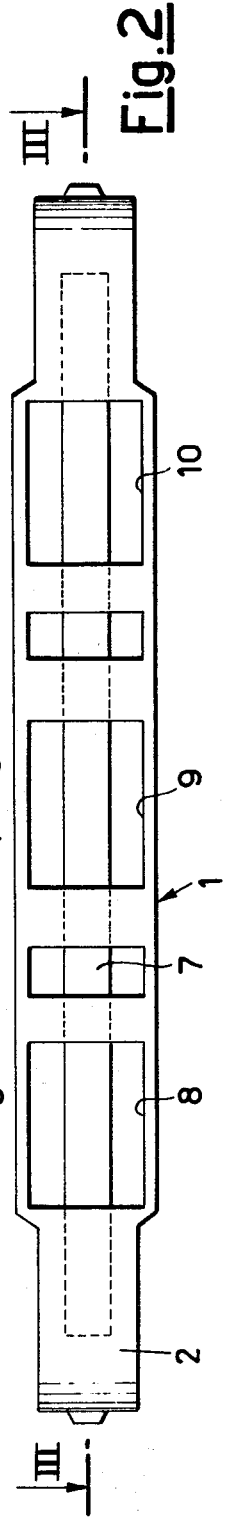

MACHINE FOR WINDING MAGNETIC TAPES ONTO CASSETTES

This invention relates to a machine for winding magnetic tapes onto cassettes.

Magnetic tape cassettes, when empty, are notably provided with a neutral connecting tape (commonly known as the "leader tape"), which connects together the two internal cassette spools and is partially wound thereon.

It is also known, for example from the Italian Pat. No. 918,474, that the magnetic tape is wound onto a cassette of this type by extracting a middle portion of the connecting tape through an aperture provided for this purpose in the cassette casing, cutting said middle portion into two pieces, which are connected to one end and the other of the two inner cassette spools respectively, joining the free end of a reel of magnetic tape to the cut end of one of said pieces so as to connect the magnetic tape to one of the cassette spools, driving this latter spool so as to wind thereon nearly the entire required length of magnetic tape, cutting the length of magnetic tape from the rest of the magnetic tape reel, joining the cut end of the length of magnetic tape to the cut end of the other portion of connecting tape, and again driving said cassette spool to complete the winding of the length of magnetic tape.

Certain known machines are commercially available for carrying out this winding operation, and basically comprise support and unwinding means for a reel of magnetic tape, a support seat for the empty cassette comprising drive means for one of the spools thereof, a cutting and jointing area disposed in the path of the magnetic tape between the reel from which it unwinds and the cassette, and comprising cutting and jointing means, and extractor means for extracting a middle portion of connecting tape from the cassette and disposing it superimposed on one end of the magnetic tape in the cutting and jointing area.

It is apparent that in machines of this type the extraction of the connecting tape represents just one of the many operational stages which follow each other and for which the operational times are added together.

The object of the present invention is to provide a winding machine in which the extraction of the connecting tape takes place simultaneously with other operations, so as to reduce the total winding time.

According to the invention, this object is attained by a machine comprising two parallel assemblies disposed one in front of the other, one of which is adapted to fill the cassette by cutting and jointing the magnetic tape and the already extracted connecting tape, and comprises support and unwinding means for a magnetic tape reel, a support and filling seat for the cassette, and a cutting and jointing area disposed in the path of the magnetic tape between the reel from which it unwinds and the cassette arranged in the support and comprising cutting and jointing means, while the other is adapted to preparing the cassette by partially extracting its connecting tape and comprises a temporary support seat for the cassette and extractor means to extract a middle portion of connecting tape from the cassette and dispose it in front of the cutting and jointing area, there being provided means for the mutual approach of the parallel assemblies, and transfer means for transferring the cassette contained in the temporary support seat and the already extracted portion of connecting tape, into the support and filling seat and into the cutting and jointing area respectively.

It is apparent that by dividing the machine according to the invention into two parallel assemblies capable of simultaneously carrying out certain operations, the cassette can be prepared by partially extracting its connecting tape while the actual filling of the previous cassette takes place, with the obvious result of appreciably reducing the total winding time and thus correspondingly increasing the machine productivity.

This and further characteristics of the present invention will be more evident by reference to the accompanying drawings, given by way of non-limiting example, in which:

FIG. 2 is a frontal view of a cassette to be filled with magnetic tape;

FIG. 3 is a section through said cassette on the line III—III of FIG. 2;

Figure 1:
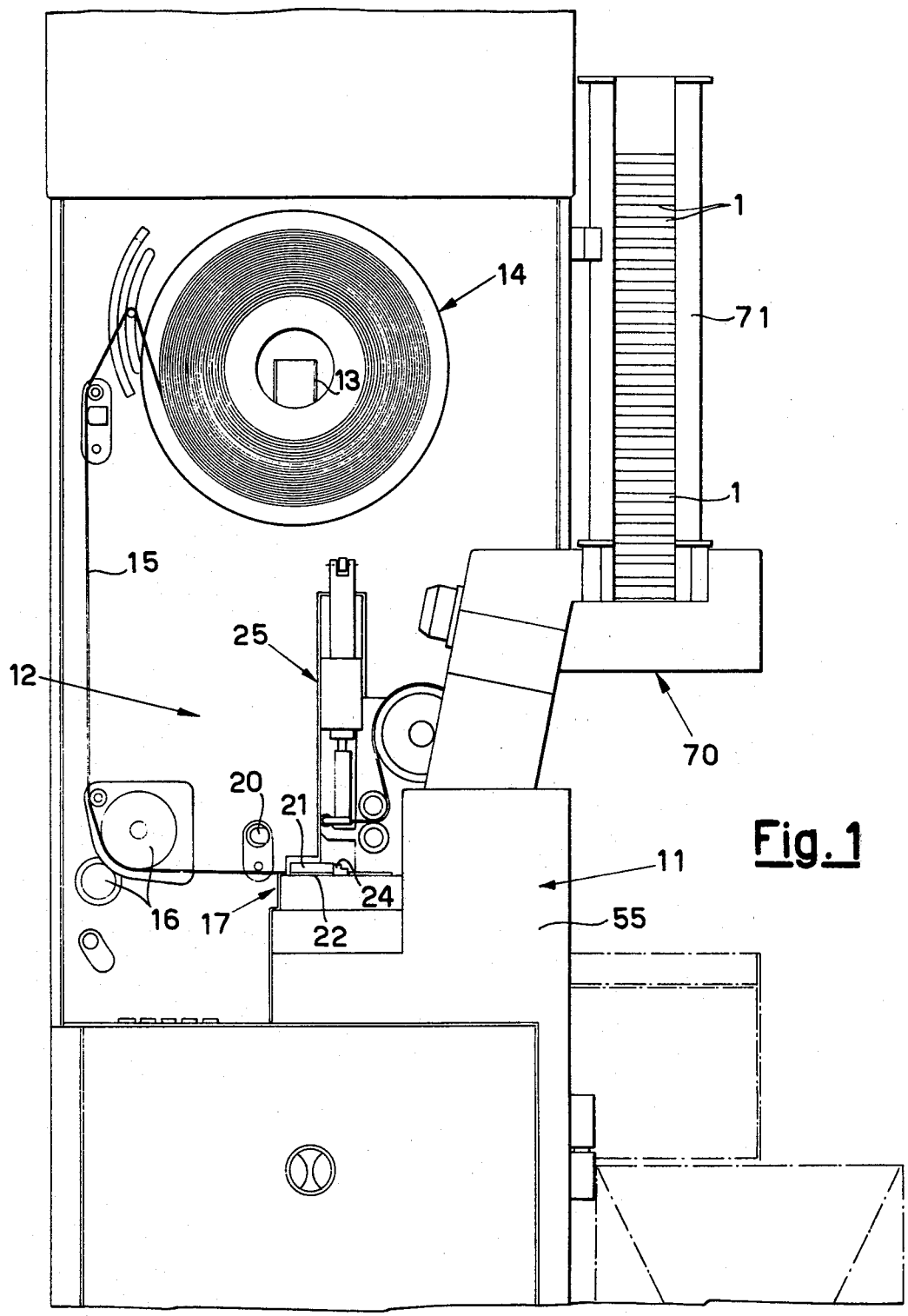
FIG. 1 is a diagrammatic elevation of the general layout of a machine according to the invention.

The winding machine shown on the drawings is provided for winding a desired length of magnetic tape onto a magnetic tape cassette of the general type indicated by the reference numeral 1 in FIGS. 2 and 3. As can be seen from the figures, the standard cassette 1 comprises a box casing of approximately parallelepiped shape 2, in which two spools 3 and 4 provided with drive sockets (holes 5 and 6) assessible from the outside of the casing are rotatably disposed. When the cassette is empty, a neutral connecting tape 7 also known as the "leader tape" extends from one to the other of the spools, and is accessible from the outside and thus extractable through one of three apertures 8, 9 and 10 contained in a thickened lateral edge thereof.

Figure 5:
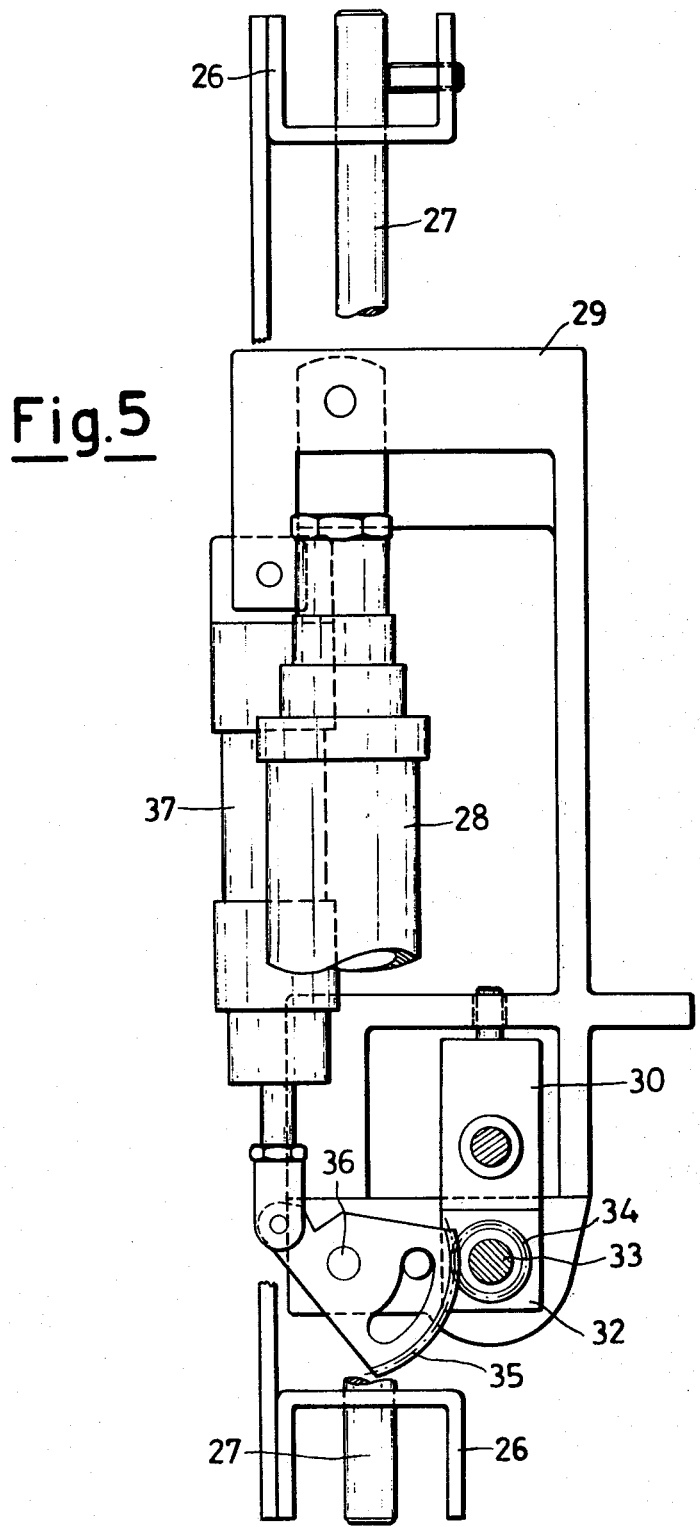
FIGS. 5, 6 and 7 are partially sectional enlarged frontal, side and plan views of a device used in the machine of FIG. 1 for transferring the already extracted portion of connecting tape from the preparation assembly to the filling assembly.
Figure 6:
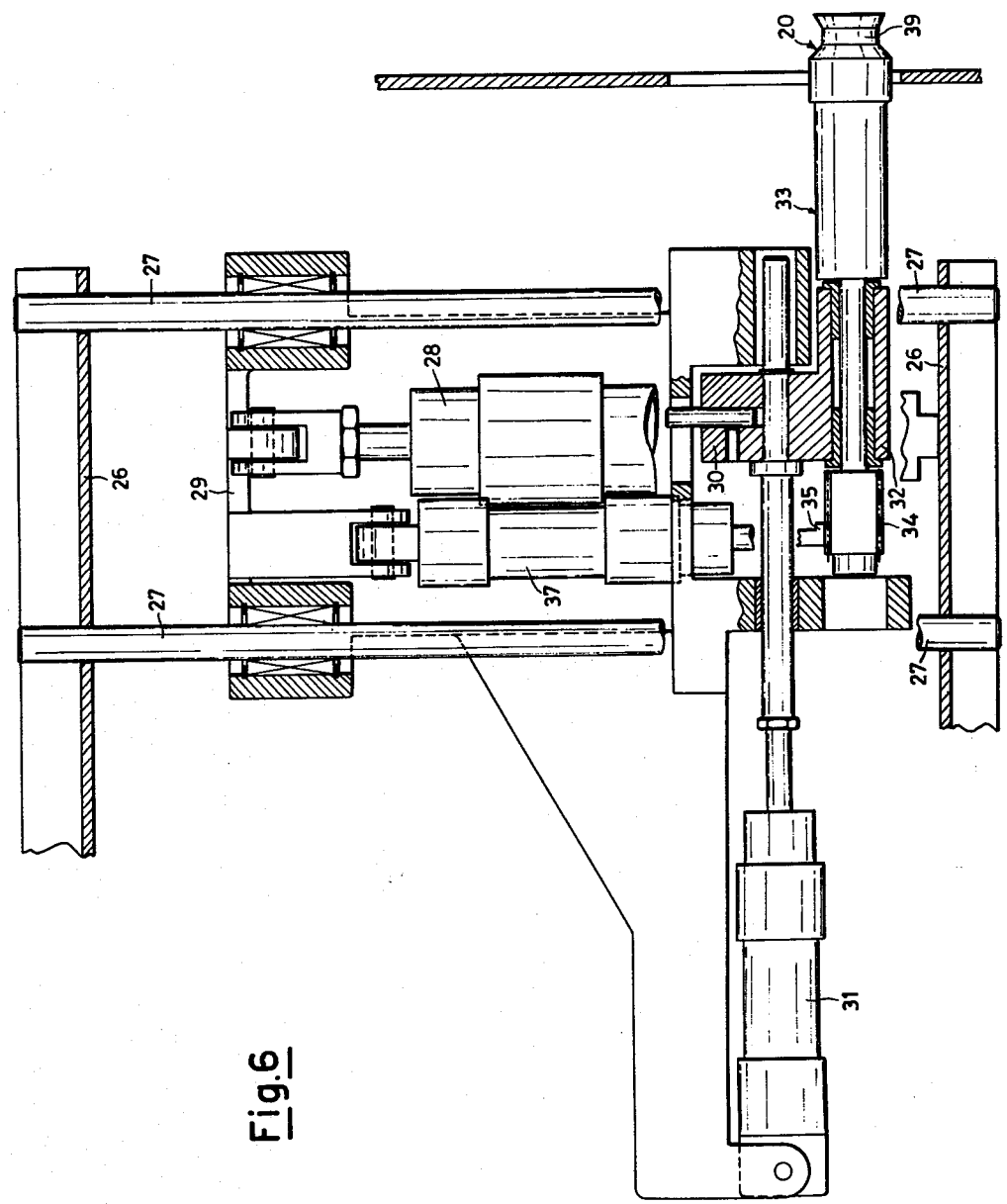
Figure 7:
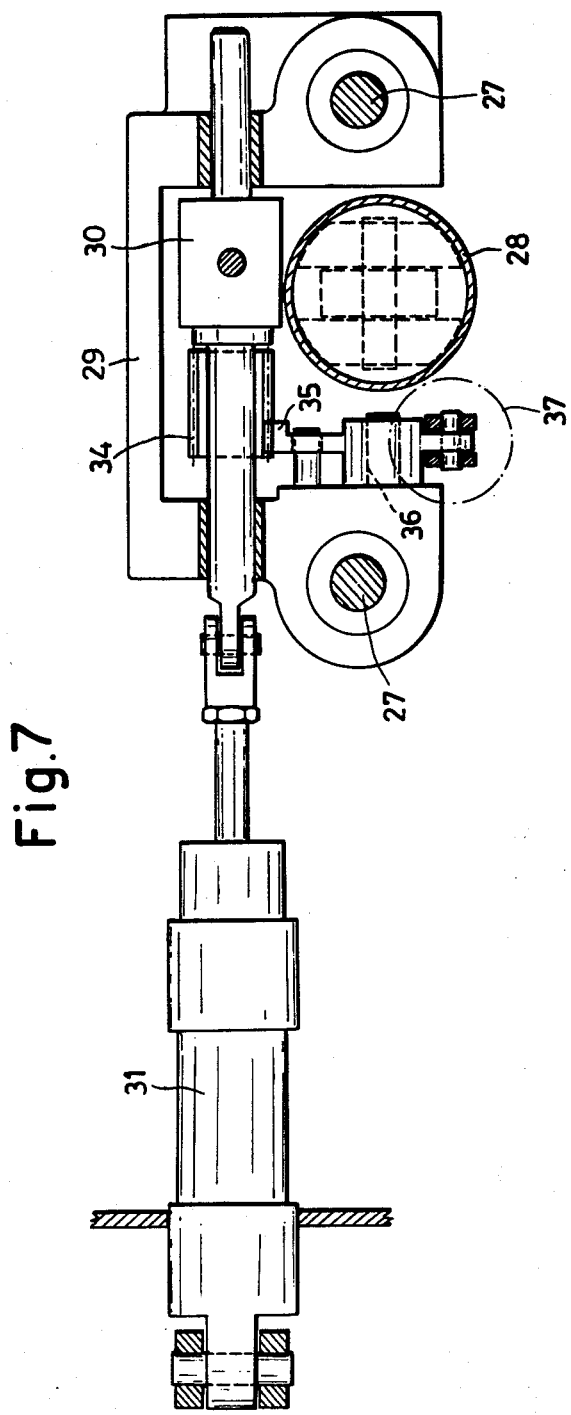
Figure 14:
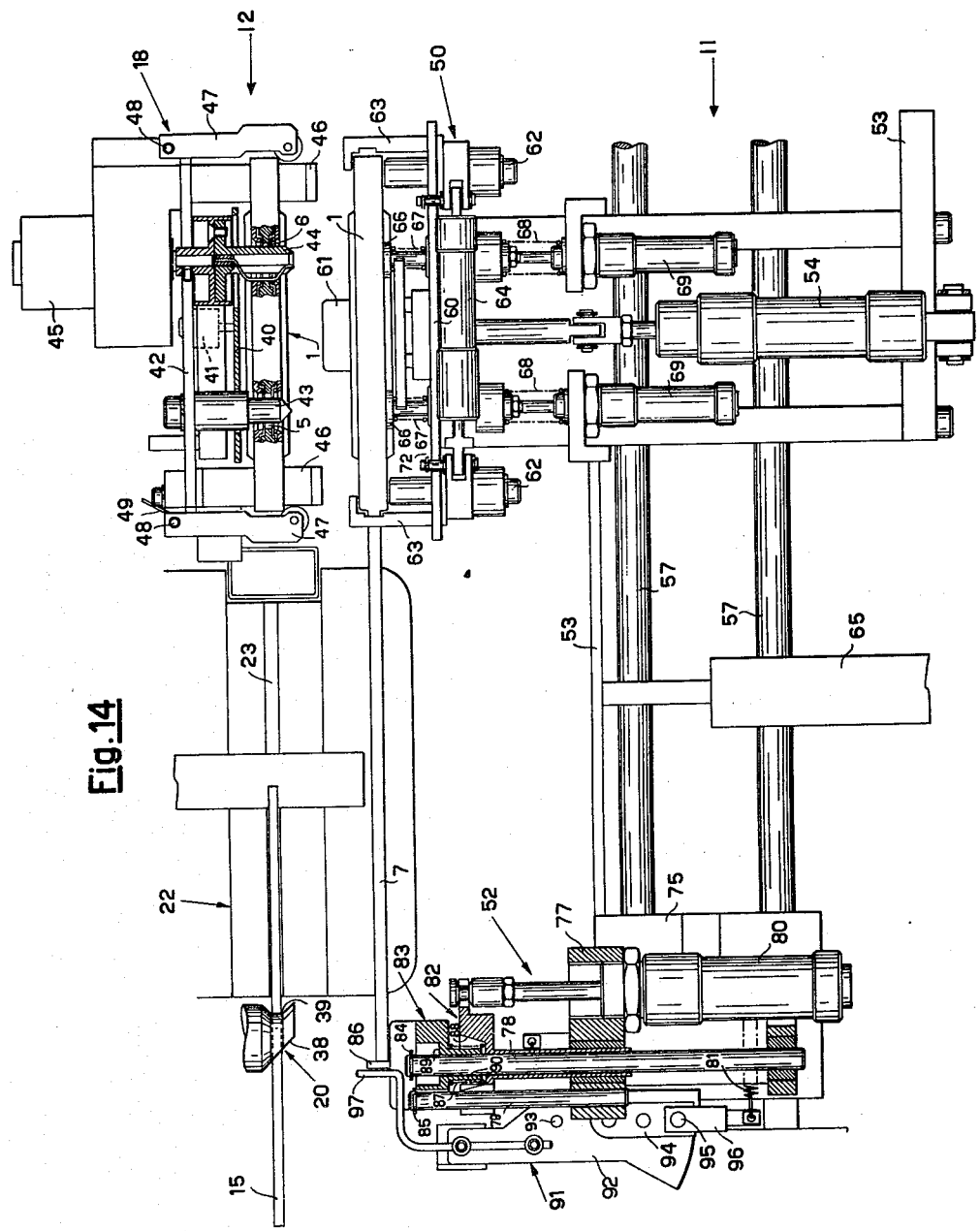
FIG. 14 is a partially sectional plan view of the preparation and filling units after said movement of the extracted portion of connecting tape and before the transfer of the prepared cassette and the relative extracted tape into the filling unit.
Figure 15:
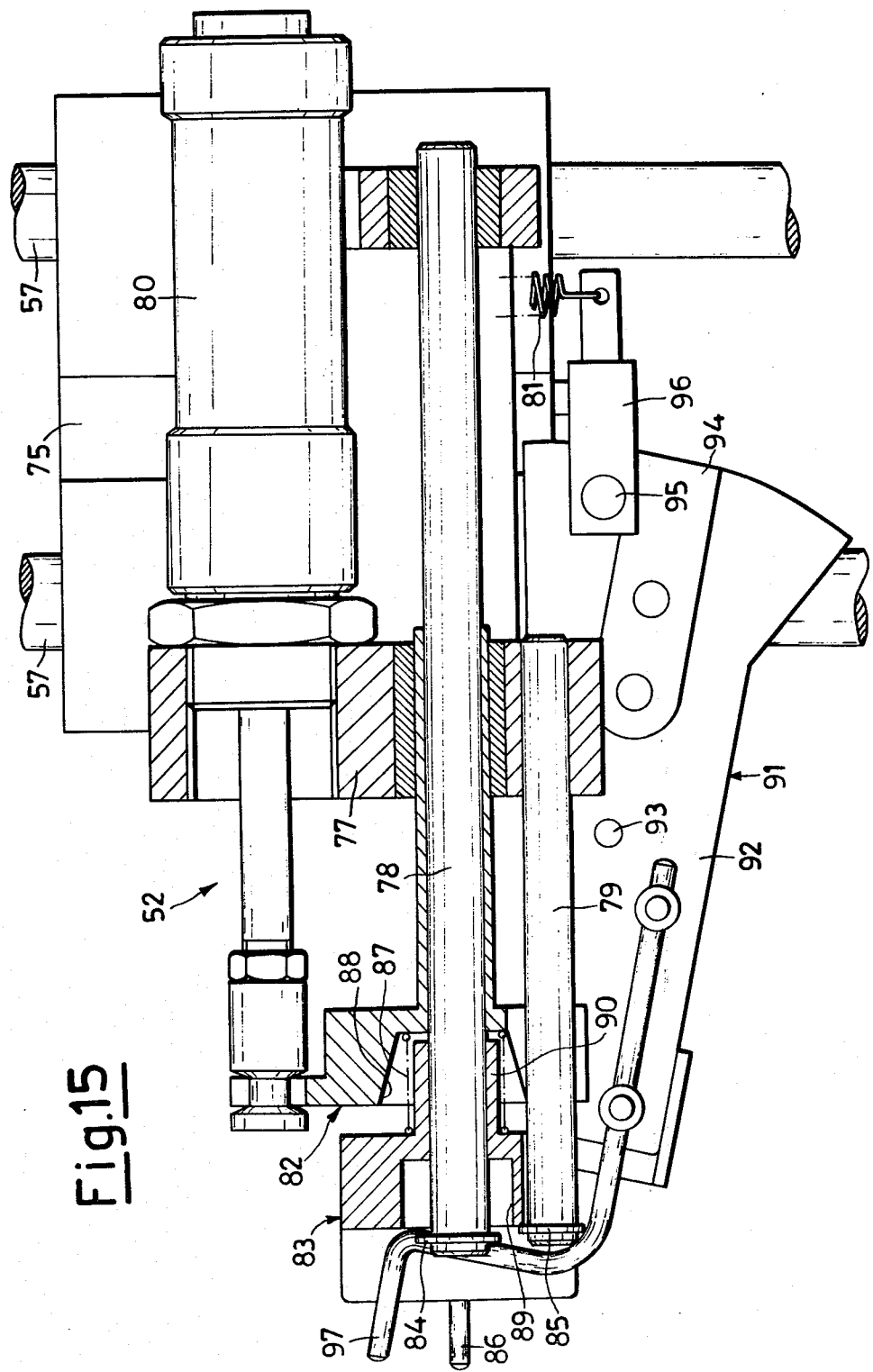
FIG. 15 is a partially sectional plan view of a possible arrangement of the extractor device of FIG. 9 in the case of lack of, or inadequate extraction of the connecting tape.

As can be seen in particular in FIGS. 1 and 14, the machine shown on the drawings is formed from two parallel operational assemblies 11 and 12 disposed one in front of the other, the purpose of the first being to prepare the cassette with its connecting tape already extracted for subsequent filling by the second. This latter (FIGS. 1 and 4) comprises rotatable support means 13 for a reel 14 of magnetic tape 15, deviation means 16 for the magnetic tape, a cutting and jointing area 17 (traversed by the magnetic tape 15) and finally a support seat 18 for the cassette when being filled. In the cutting and jointing area 17 (FIG. 4) is a transfer device 19 provided with a shaped prong 20, pressure means 21 cooperating with a plate 22 provided with a groove 23 (FIGS. 14 and 16), a cutter 24 and a jointing device 25. The pressure means 21, the grooved plate 22, the cutter 24 and jointing device 25 correspond structurally and operationally to analogous cutting and jointing means described in Italian Pat. No. 918,474, to which reference is made without repeating its description. The transfer device 19 is shown in detail in FIGS. 5, 6 and 7, and comprises a fixed support 26 provided with two vertical guide rods 27 along which a pneumatic cylinder 28 is able, when driven, to move a substantially C-shaped structure 29. This latter slidably carries a horizontally mobile member 30 operated by a pneumatic cylinder 31, and rigidly supports a block 32 which rotatably supports a spindle 33. The rear end of this latter comprises a cylindrical gear 34 with which there engages a toothed sector 35 rotated about a pivot 36 by a pneumatic cylinder 37 carried by the vertically mobile structure 29. The front end of the rotatable spindle 33 carries the shaped prong 20, which, as shown in FIGS. 4, 14, 16, 17 and 18, comprises on one side a bevel 38 and on the other side an undercut 39. The purpose and method of operation of the shaped prong 20 will be evident hereinafter. The support seat 18 finally comprises (FIG. 14) a fixed plate 40, relative to which a cylinder 41 horizontally drives a plate 42 supporting an idle spindle 43 arranged for insertion into one of the two drive sockets 5 and 6 of the cassette 1, a motorised spindle or hub 44 arranged for introduction into the other drive socket of the cassette, a drive motor 45 for the hub 44, two fixed L brackets 46 designed to support the cassette from below, and two levers 47 pivoted at 48, and which are kept in a position such that the cassette is laterally locked by springs 49.

Figure 8:
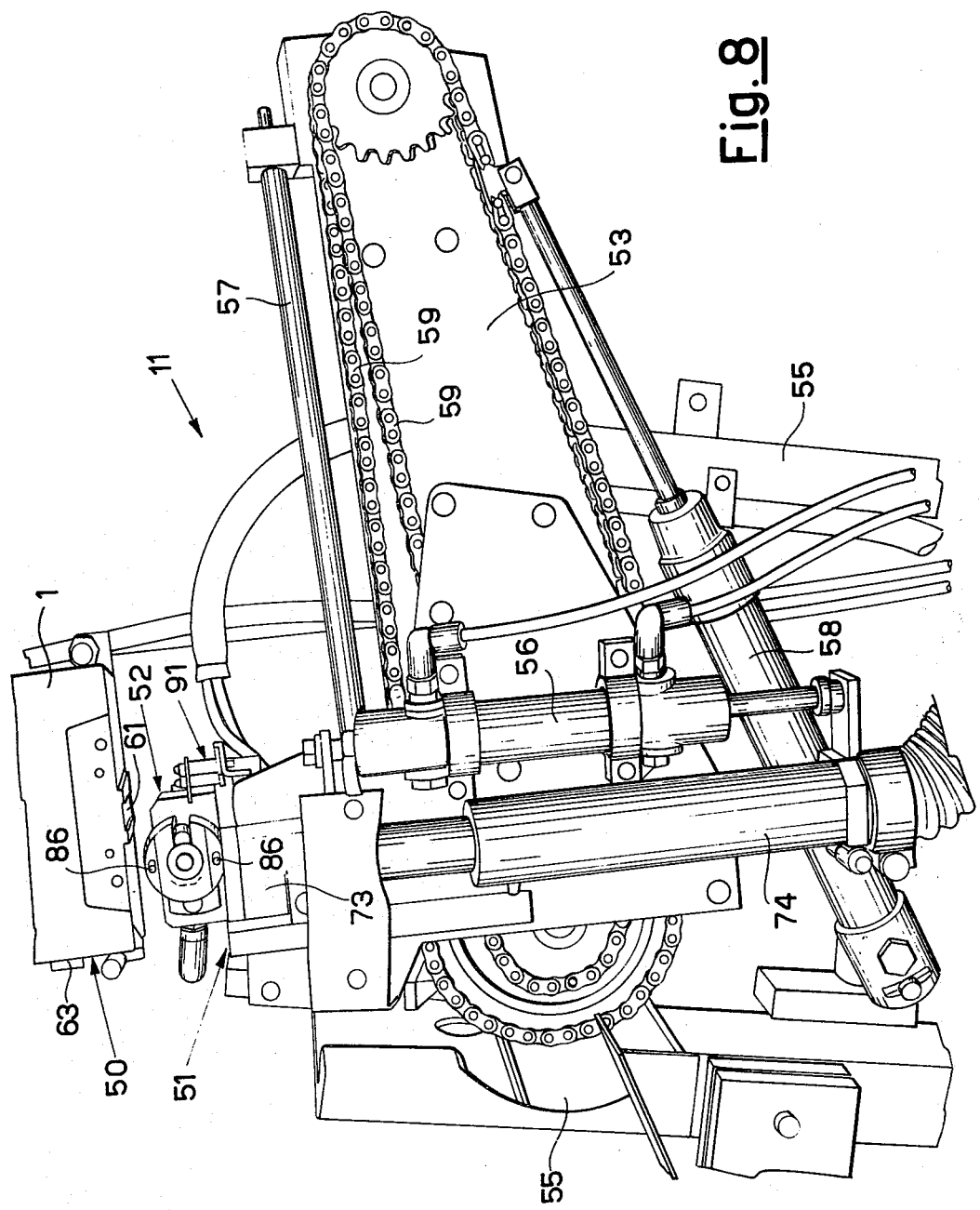
FIG. 8 is a frontal view of the preparation assembly of the machine of FIG. 1, when at rest.
Figure 9:
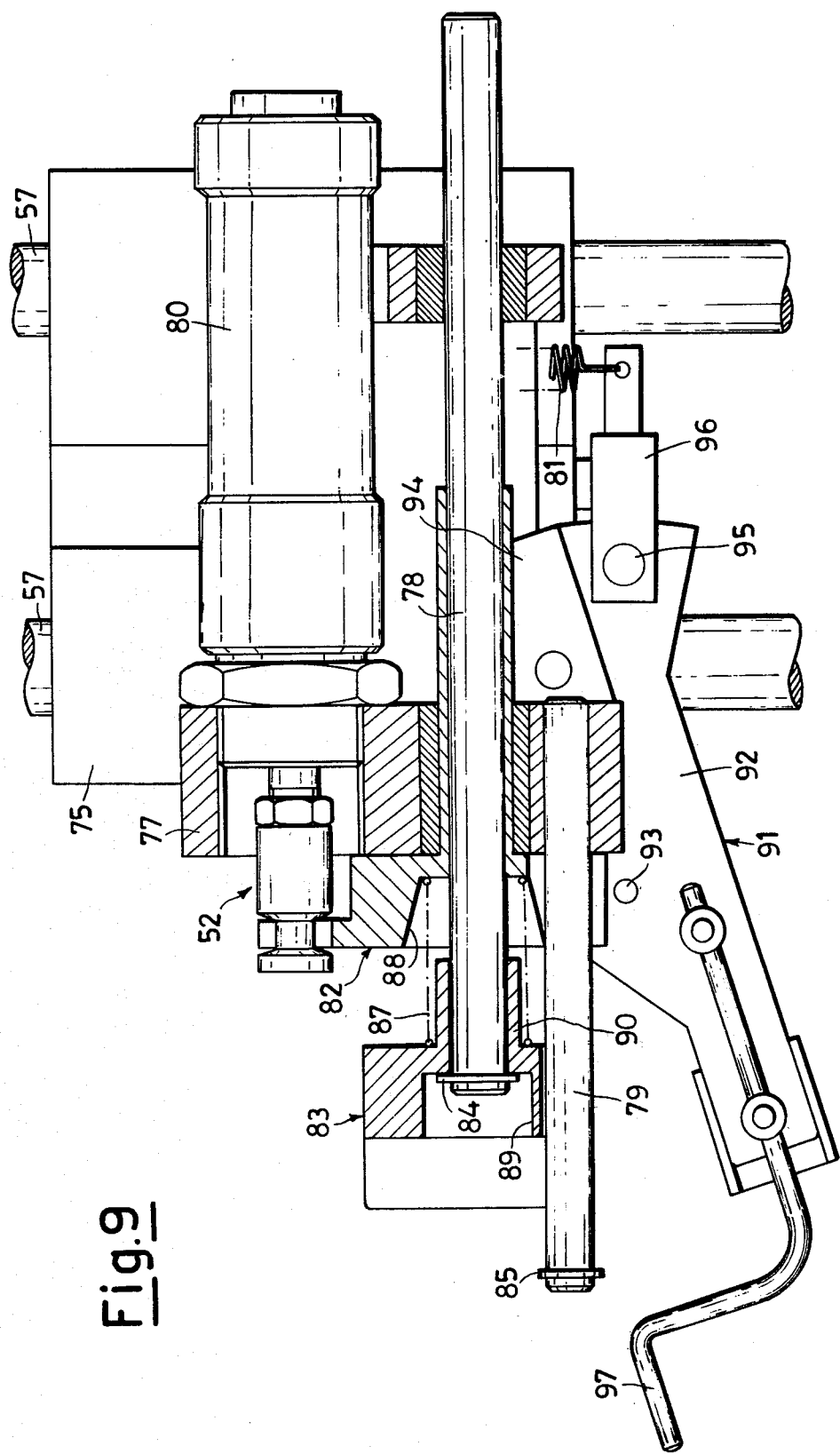
FIG. 9 is a partially sectional plan view of an extractor device for connecting tape, forming part of the preparation assembly shown in FIG. 8.

The preparation assembly 11 comprises basically (FIGS. 8–16) a temporary support seat 50 for the empty cassette, a suction device 51 and an extractor device 52, the devices 51 and 52 constituting together the extractor means for the extraction and suitable prior positioning of the connecting tape of the empty cassette during the preparation stage. The support seat 50, the suction device 51 and extractor device 52 are supported by a support structure 53 which is normally removed from the filling assembly 12, but may be made to approach it for the transfer of the prepared cassette (FIGS. 14 and 16) by operating a pneumatic cylinder 65 (FIG. 14) acting against a fixed structure 55 (FIGS. 1 and 8). The suction device 51, disposed below the temporary support seat 50, is also movable vertically from a rest position removed from the seat 50 (FIG. 8) to a closer position (FIG. 10) and vice versa (FIGS. 11 and 12) by operating a pneumatic cylinder 56. Finally, the extractor device 52 is movable along longitudinal guides 57 carried by the support structure 53, from a rest position in which it lies substantially between the temporary support seat 50 and the suction device 51 (FIGS. 8, 10, 11 and 12) to a working position in front of the transfer device 19 (FIGS. 14 and 16) by operating a pneumatic cylinder 58 acting on a chain system 59 (FIG. 8).

Figure 16:
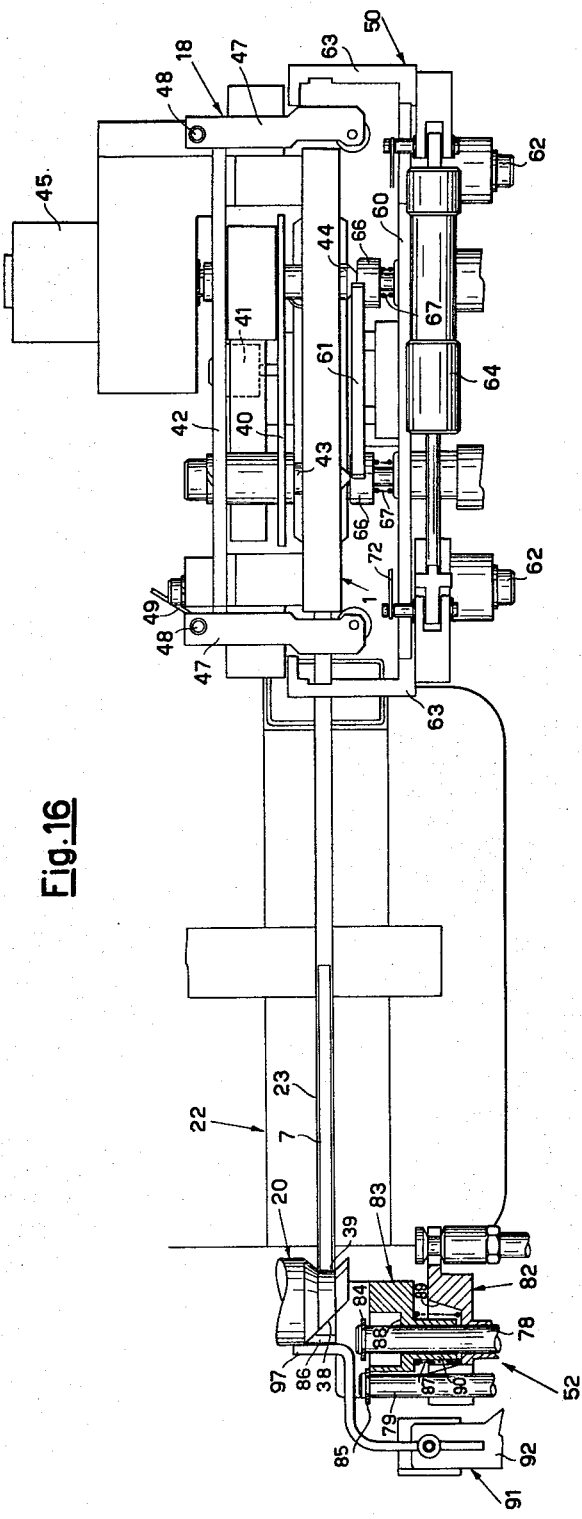
FIG. 16 is a partially sectional plan view of the same assemblies at the moment of transfer of the prepared cassette from the preparation assembly to the filling assembly.

The temporary support seat 50 is shown in detail in FIGS. 14 and 16 (and partially in FIGS. 8, 12 and 13) and comprises a plate 60 which constitutes the support base for the entire structure receiving and releasing the empty cassette. A L bracket 61 is fixed on the plate 60 to support the bottom rear of the cassette 1, and two side and front grips 63 are pivoted at 62, these latter being under the action of a return spring 72 and can be opened by a pneumatic cylinder 64. The plate 60 also slidably supports two pillers 66 pushed forwards by springs 67 and 68 and returnable by pneumatic cylinders 69. The plate 60 is movable forwards and backwards relative to the support structure 53 by a pneumatic cylinder 54. As can be seen from FIG. 1, the temporary support seat 50 is surmounted by an empty cassette feed device 70 able to feed the cassettes one at a time with the apertures 8, 9 and 10 always pointing downwards (FIGS. 8 and 10 to 13) whatever their position in the vertical loader 71. The feed device is preferably of the type described in U.S. Pat. No. 4,078,698.

Figure 11:
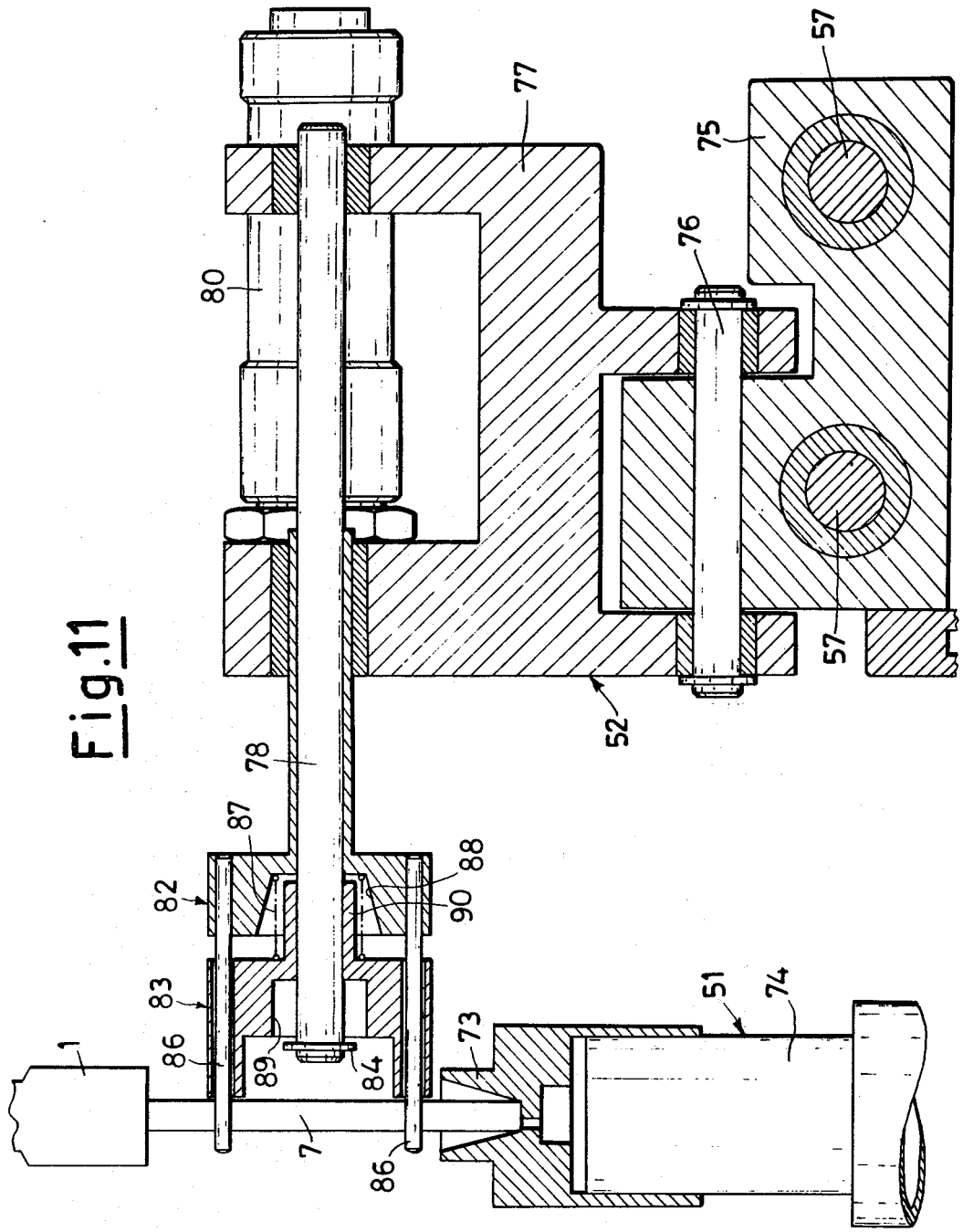
FIG. 11 shows the same extractor means in a subsequent operating stage, with parts sectioned.
Figure 12:
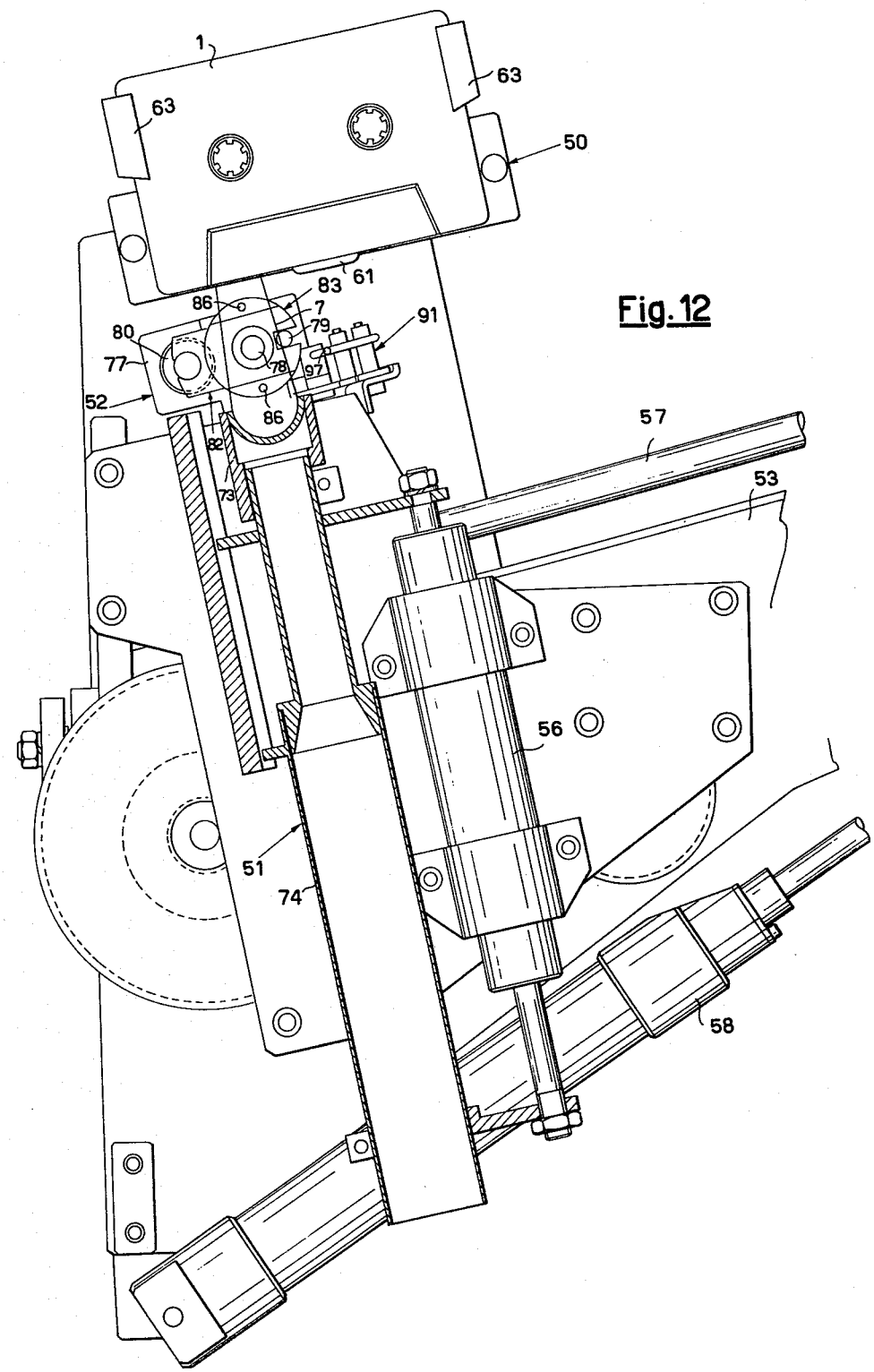
FIG. 12 is a partially sectional frontal view of said extractor means under the same operating conditions as in FIG. 11.

The suction device 51 comprises a concave suction port 73 (FIGS. 11 and 12) connected to a suction pump (not shown on the drawings) by a conduit system 74 (FIGS. 8 and 12).

Finally, the extractor device 52 comprises (FIGS. 8 to 16) a base carriage 75 slidable along the guides 57 under the control of the cylinder 58 and chains 59. A swivel arm 77 slidably supporting two parallel bars 78 and 79 is pivoted at 76 to said carriage, a pneumatic cylinder 80 also being fixed thereto. A spring 81 tends to resist the angular movement of the swivel arm 77 towards the position of FIG. 13. The pneumatic cylinder causes a first (82) of two relatively mobile blocks 82 and 83 to move forwards and backwards (towards and away from the filling assembly 11), the first of these blocks being rigid with the slidable bar 78 (provided with an end retention ring 84) and slidably carrying the other bar 79, while the second is rigid with the slidable bar 79 (provided with an end retention ring 85). Two extractor bars 86 are rigid with the rear block 82 and slidably pass through the front block 83, thus projecting forwards when the two blocks 82 and 83 are relatively close to each other as in FIGS. 11 and 14 to 16, and being completely contained within the space occupied by the two blocks 82 and 83 when these latter are relatively withdrawn as in FIGS. 9 and 10. A spring 87 thrusts the two blocks 82 and 83 into this latter position. Both the blocks 82 and 83 are provided with a central front cavity (88 and 89 respectively) and the block 83 is provided with a rear axial projection 90 insertable into the cavity 88 of the block 82.

Figure 13:
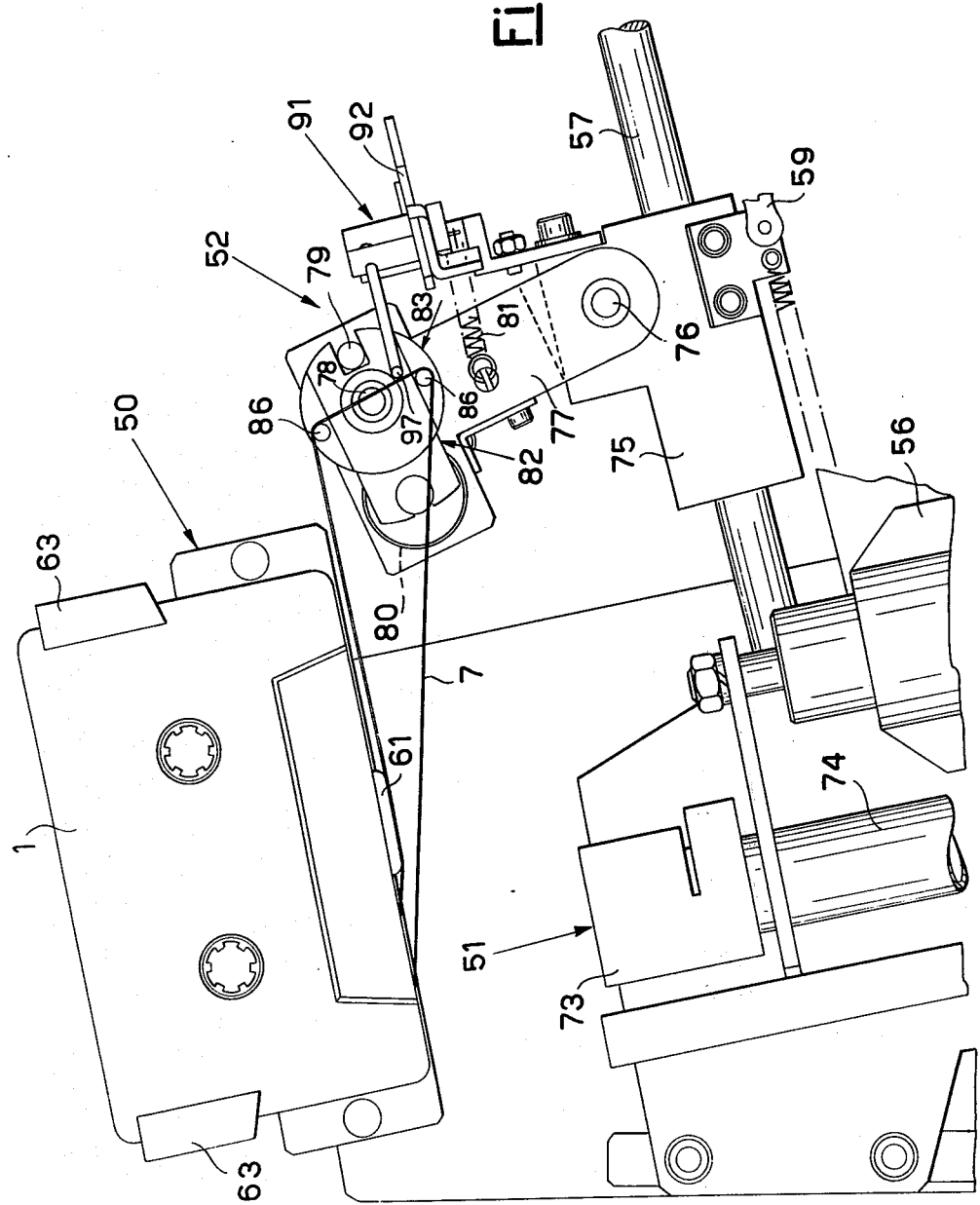
FIG. 13 is a frontal view of said preparation unit during the movement of the extracted portion of connecting tape in front of the cutting and jointing area of the facing filling assembly.

With the extractor device 52 there is also associated a feeler 91 formed from a flat lever 92 pivoted at 93 to the slidable carriage 75. To the end of the lever 92, the weight of which tends to urge it into the position of FIG. 15, there is fixed a plate 94 arranged to cooperate with a photosensor 95 supported by a support 96 rigid with the carriage 75, in such a manner as to indicate during the extraction of the connecting tape from the cassette if the feeler 91 is in the correct working position as shown in FIGS. 13 and 14, i.e. with its front feeler prong 97 resting on the connecting tape 7 extracted by the extracting bars 86 (as will be further explained hereinafter).

Figure 10:
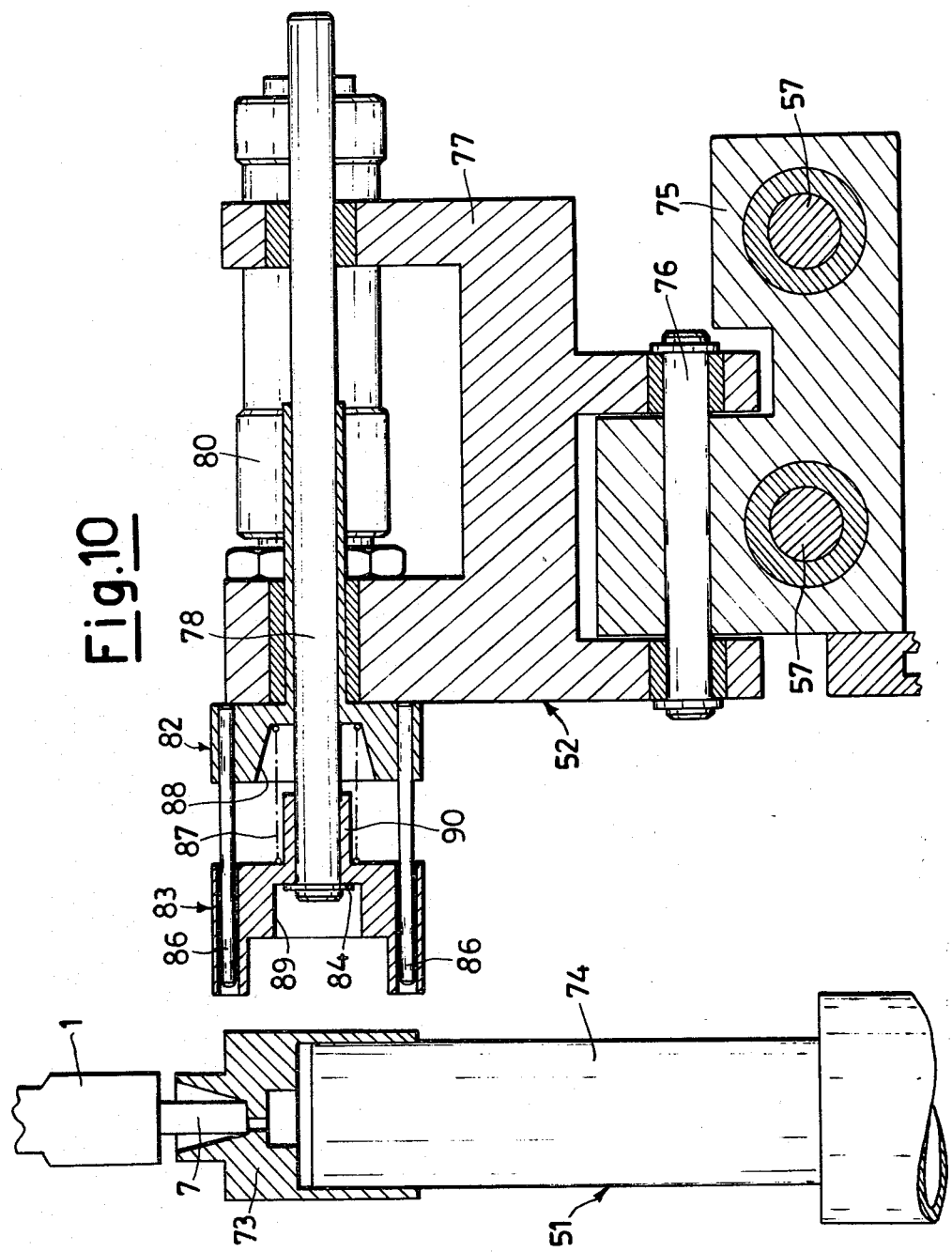
FIG. 10 is a side view, at the beginning of the extraction stage, of the extractor means for connecting tape which make up the preparation assembly shown in FIG. 8.

The method of operation of the machine shown in the drawings for winding magnetic tape onto empty cassettes such as that shown in FIGS. 2 and 3 is as follows. After the feed device 70 has inserted an empty cassette (with the apertures 8, 9 and 10 facing downwards) into the temporary support seat 50, where it is retained by the L bracket 61 and the side grips 63, the suction device 51, which is positioned exactly below one of said apertures (FIGS. 8, 12 and 13) is made by the cylinder 56 to rise towards the cassette to allow the port 73 to suck and extract a small loop of connecting tape 7 from the cassette (FIG. 10). During this stage the extractor device 52 is close to the support seat 50, but with the blocks 82 and 83 in a retracted close position and with the feeler 91 kept in the open position of FIG. 9 by a suitable stop (not shown on the drawings) rigid with the support seat 50. The suction device 51 is then made to move downwards again, the result of which is that a larger loop of connecting tape 7 is extracted, into which the extracting bars 86 of the extractor device 52 become inserted (FIGS. 11 and 12) by the action of the cylinder 80 (the cylinder 80 causes the block 82 and therefore the bars 86 to move forward, while the block 83, because of the weakness of the spring 87, tends to approach the block 82, thus allowing the extracting bars 86 to emerge). The carriage 75 and hence the extractor device 52 are then moved by the cylinder 58 towards the position shown in FIG. 14, in which the two extracting bars 86 engage in the extracted loop of connecting tape 7 so that they entrain the tape and cause further extraction (FIG. 13). While the extractor device 52 moves towards the position of FIG. 14, carrying with it an increasingly greater portion of connecting tape 7, the feeler 91, no longer retained, rests by its feeler prong 97 on the tape 7 (FIGS. 13 and 14), so that if the tape has been correctly extracted the feeler 91 is kept in the position which ensures that the plate 94 remains below the photosensor 95 to give the signal for the subsequent operating stages. If however, for example, the tape 7 has left its engagement with the extracting bars 86, the feeler 91 moves into the position of FIG. 15 and the photosensor 95 would then cause the extracting cycle to be repeated.

Figure 4:
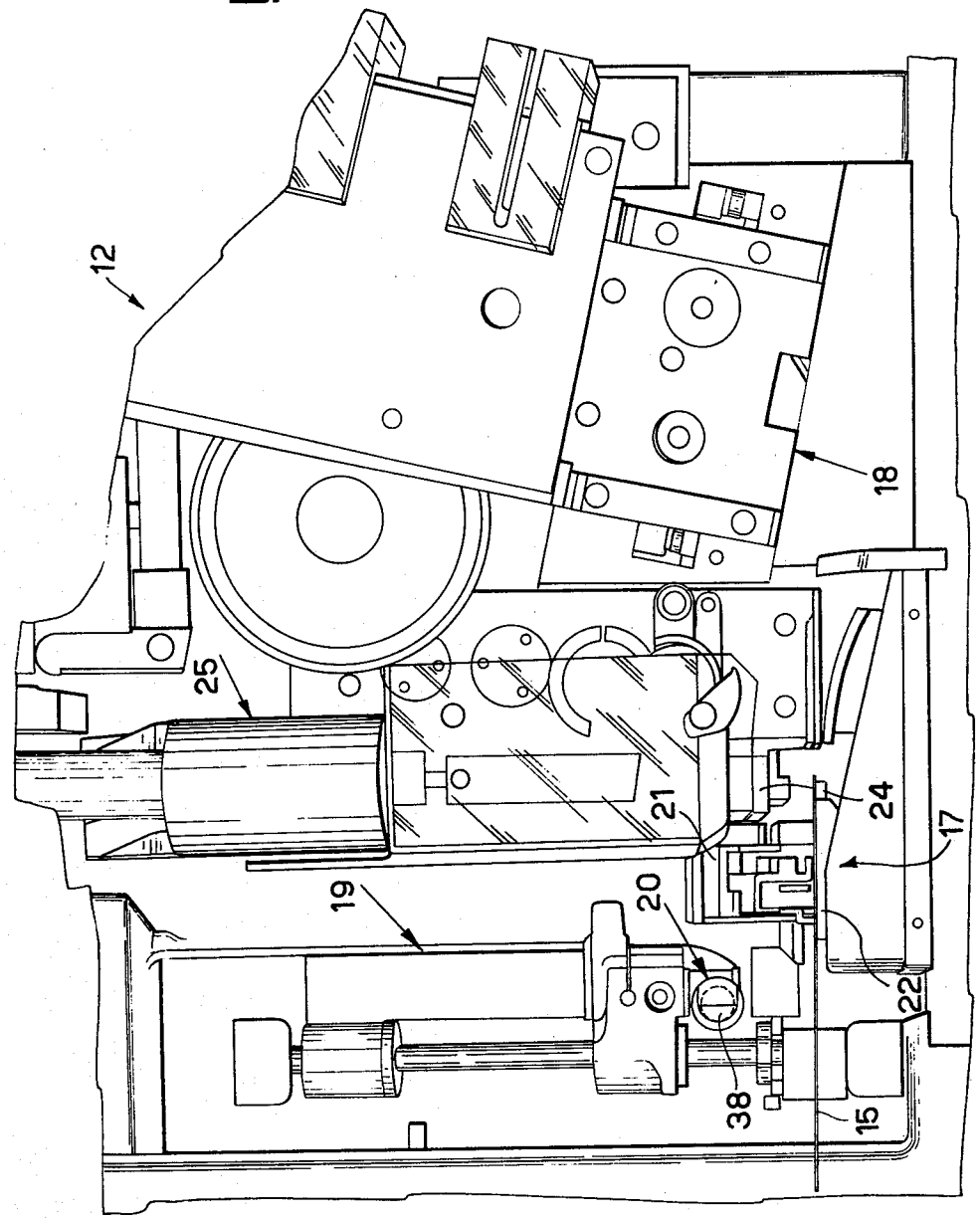
FIG. 4 is an enlarged frontal detailed view of the cutting and jointing area of the machine of FIG. 1.

The translatory motion of the extractor device 52 stops when the device is in the position shown in FIG. 4, i.e. exactly in front of the transfer device 19 and with the extracted portion of connecting tape 7 in front of the cutting and jointing area of the facing filling assembly 12. At that moment this latter has its shaped prong 20 raised as in FIGS. 4 and 17 and advanced and positioned as in FIG. 14, its pressure means 21 raised, its cutter 24 withdrawn, its jointing device 25 at rest, one half of the groove 23 of its plate 22 occupied by the previously cut end of the magnetic tape 15, and its support seat 18 still occupied by the previous cassette which has been filled and is close to being expelled.

Figure 17:
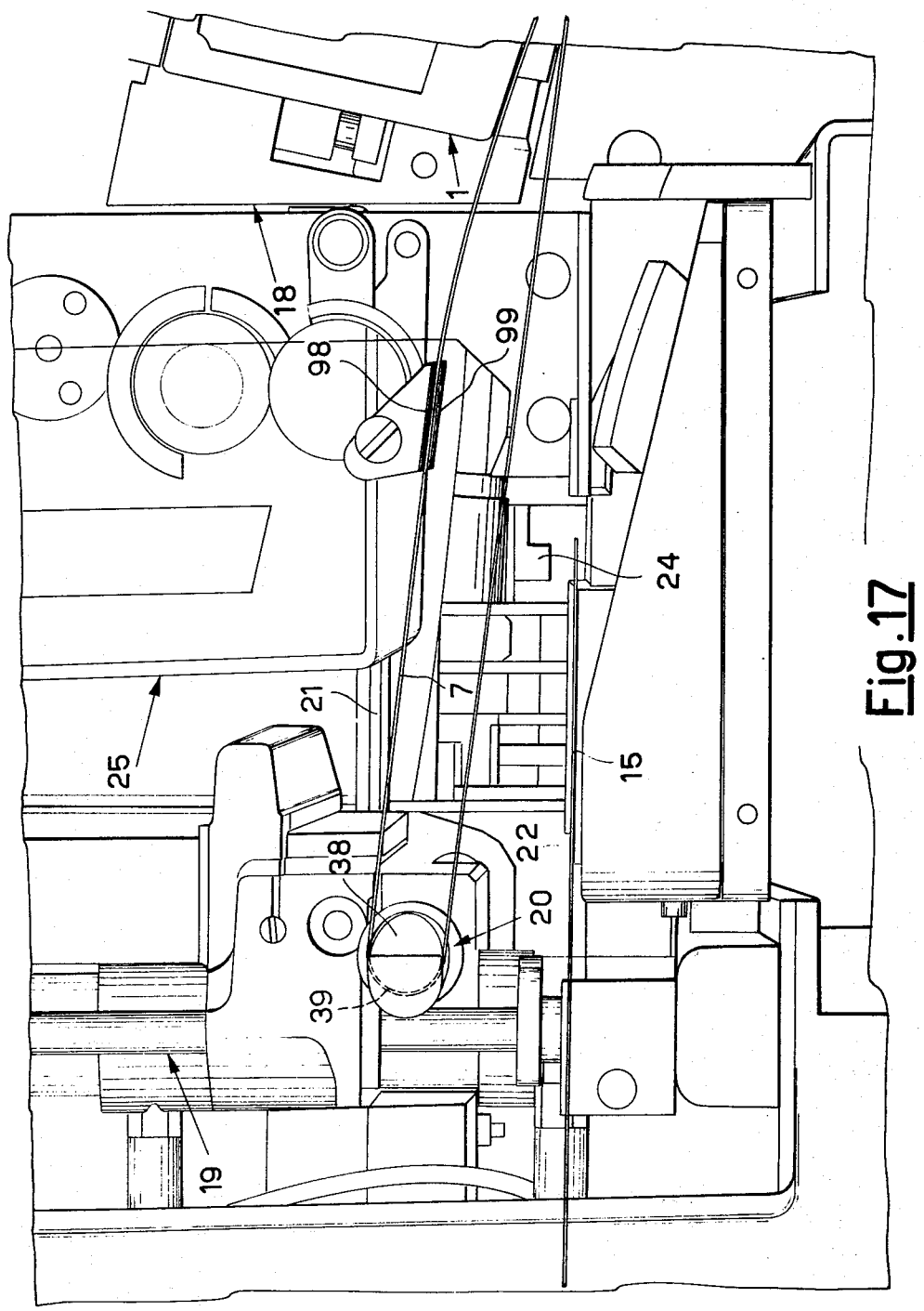
FIG. 17 is a frontal view of the filling unit immediately after receiving the prepared cassette and the relative extracted tape.

As soon as the cassette still inserted in the seat 18 has been allowed to fall from this latter by withdrawing the plate 42 and the associated spindles 43 and 44, brackets 46 and levers 47 by means of the cylinder 41, the cylinder 65 causes the entire unit comprising the temporary support seat 50 with its relative prepared cassette 1, the suction device 51 and the extractor device 52 with the relative extracted tape 7 to move towards the filling assembly 12 to transfer to it both the cassette and the extracted tape (FIG. 16). The cassette is transferred by causing the cylinders 54 and 64 to further advance the plate 60 and L bracket 61 and simultaneously rotate the grips 63 into the open position, by which the cassette 1 is released from its engagement with the temporary support seat 50 and instead engaged with the support and filling seat 18, in which the cassette, with the spindles 43 and 44 in the drive socket holes 5 and 6, is retained by the L brackets 46 and levers 47. During this stage, the pillars 66, controlled by the cylinders 69, push against the ends of the spindles 43 and 44 so as to keep them at rest by friction and thus prevent undesirable movement of the spools 3 and 4. Immediately afterwards the pillars 66 and plate 60 again withdraw to leave the cassette free in the seat 18. The transfer of the connecting tape 7 extracted and retained by the bars 86 of the extractor device 52 is carried out by rotating the shaped prong 20 through 180° and then withdrawing the bars 86 by the cylinder 80, so that the connecting tape 7, freed from these bars, is taken into the undercut 39 in the shaped prong 20 (FIG. 17). The entire unit consisting of the temporary support seat 50, the suction device 51 and extractor device 52 is then again withdrawn from the filling assembly 12 and returned to the rest position of FIG. 8, from which the preparation of a new cassette fed by the feed device 70 immediately begins.

Figure 18:
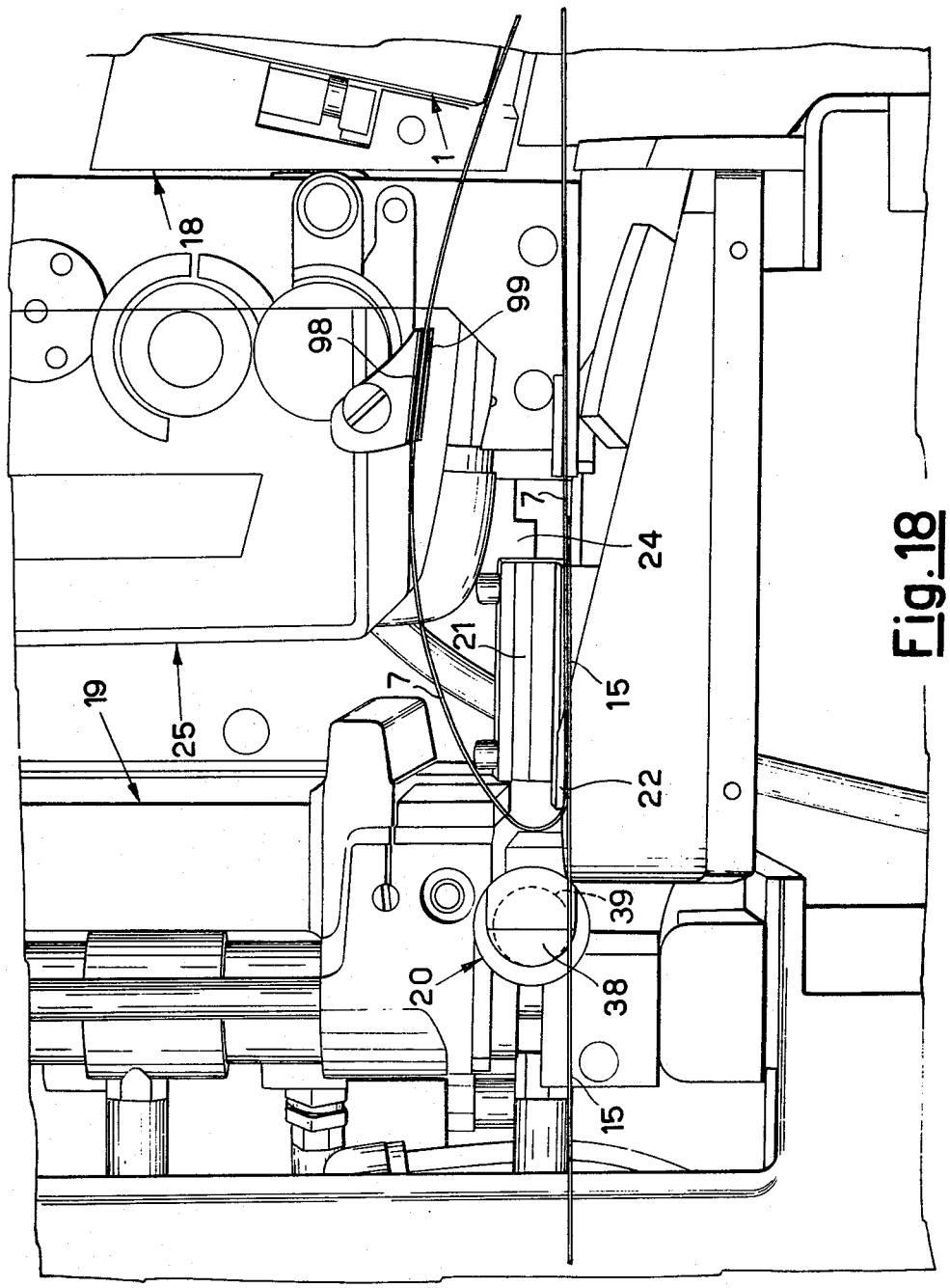
FIG. 18 is a frontal view of the filling assembly in the immediately subsequent stage, when the transfer device transfers the connecting tape into the cutting and jointing area suitably superimposed on the end of the magnetic tape to be wound.

In the meantime the previously prepared cassette has been transferred to the filling unit 12, in which the tape 7 is supported by the shaped prong 20 in the raised position (relative to the grooved plate 22 and prearranged magnetic tape 15) of FIG. 17. At this point the cylinder 28 of the transfer device 19 causes the shaped prong 20 to be lowered with consequent lowering of the lower portion of the connecting tape 7 onto the magnetic tape 15 and into the groove 23 of the plate 22, while the upper portion of the connecting tape remains raised by its engagement between two bent lugs 98 and 99 disposed in front of the jointing device 25 (FIG. 18). The shaped prong 20 is then again rotated through 180° and withdrawn by the cylinders 37 and 31, so as to free the connecting tape 7, the lower portion of which thus remains superimposed on the magnetic tape 15 in the groove 23 of the plate 22, being retained there by the pressure means 21, lowered for this purpose.

At this point the final filling operation begins, corresponding substantially to that described in the aforesaid Italian Pat. No. 918,474, and therefore referred to only briefly here. In short, with the presser 21 lowered, the cutter 24 moves forward and cuts the connecting tape 7 simultaneously with the cut end of the magnetic tape 15, the presser 21 is then raised taking with it the left hand portion (relative to FIG. 18) of the connecting tape, while the magnetic tape and the other portion of connecting tape remain in an exactly abutting condition in the groove 23 of the plate 22 (the presser 21 and plate 22 are provided with suitable suction means to aid the aforesaid operation). The jointing device 25 then descends and joins the magnetic tape and the right hand portion of the connecting tape, while the left hand portion of this latter remains in the raised position. The hub 44 is then rotated by the motor 45 to wind the right hand portion of connecting tape and the required length of magnetic tape onto the spool 4 of the cassette. The motor 45 is then halted and the presser 21 is lowered to return the cut end of the left hand portion of connecting tape into the groove 23 and thus onto the magnetic tape 15, after which the cutter 24, jointing device 25 and motor 45 are again operated to successively cut the magnetic tape 15 at the cut end of the left hand portion of connecting tape 7, join this latter to the length of magnetic tape already partially wound on the cassette and finally complete the winding of the magnetic tape and remaining portion of connecting tape onto the spool 4 of the cassette. At this point the preparation assembly 11 has already been returned to the position of FIG. 14, and while the filled cassette is expelled from the seat 18 a new cassette already prepared with the connecting tape partially extracted is transferred from the preparation assembly 11 to the filling assembly 12.

What we claim is:

1. A machine for winding magnetic tapes within cassettes provided with a neutral connecting tape joining together a pair of spools situated inside the cassette, comprising:

two parallel operating assemblies disposed one in front of the other, one of which is used for the preparation of the cassette by partially extracting the connecting tape from said cassette, and the other issued for filling the cassette with magnetic tape by cutting the already extracted connecting tape into two parts connected to respective spools in the cassette and joining said parts to respective ends of a desired length of magnetic tape;

said filling assembly comprising support and unwinding means for a reel of magnetic tape, a support and filling seat for the cassette and cutting and jointing means disposed in the path of the magnetic tape between the reel and the cassette;

said preparation assembly comprising a temporary support seat for the empty cassette disposed in front of said support and filling seat of the filling assembly, and extractor means for extracting a middle portion of connecting tape from the empty cassette and disposing said portion in front of said cutting and jointing means of the filling assmebly;

means for causing the mutual approach of said parallel operating assemblies;

first transfer means operable with the operating assemblies in the approached position to transfer the cassette from said temporary support seat of the preparation assembly to said support and filling seat of the filling assembly; and second transfer means operable with the operating assemblies in the approached position to simultaneously transfer the already extracted connecting tape from the preparation assembly to said cutting and jointing means of the filling assembly.

2. A machine as claimed in claim 1, wherein said extracting means comprise a suction device disposed below said temporary support seat for extracting a loop of connecting tape, and an extractor device movable parallel to said cutting and jointing means of the filling assembly starting from an initial position in which it is substantially interposed between said temporary support seat and said suction device.

3. A machine as claimed in claim 2, wherein said extractor device comprises a carriage slidable parallel to said cutting and jointing means of the filling assembly, and at least two extracting bars supported by said carriage and movable transversely to the direction of movement of said carriage between a withdrawn rest position and an advanced position in which, when the carriage is in said advanced position, they may be inserted between said temporary support seat and said suction device to engage with a loop of connecting tape previously extracted by the suction device, in order to then move it laterally and further extract it in the direction of movement of the carriage.

4. A machine as claimed in claim 3, wherein said carriage has associated with it a feeler provided with a feeler prong which can abut against a portion of connecting tape engaged by said extracting bars to check that said tape has been correctly extracted.

5. A machine as claimed in claim 3, wherein said second transfer means comprise a shaped prong movable vertically and horizontally and positionable angularly between a first position in which it presents to the end loop of the extracted connecting tape a bevel to facilitate insertion of the prong into said loop, and a second position in which it presents to said end loop an undercut for holding the connecting tape when released from said extracting bars.

* * * * *